United States Patent
Chan et al.

(10) Patent No.: US 7,490,316 B2
(45) Date of Patent: Feb. 10, 2009

(54) METHOD AND APPARATUS TO IMPLEMENT ADAPTIVE SCRIPTING TOOL

(75) Inventors: Lavena Chan, Austin, TX (US); John Y. Chang, Austin, TX (US); Matt M. Ranjbar, Austin, TX (US); Qinhua Wang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 970 days.

(21) Appl. No.: 11/002,694

(22) Filed: Dec. 2, 2004

(65) Prior Publication Data

US 2006/0123390 A1      Jun. 8, 2006

(51) Int. Cl.
*G06F 9/45* (2006.01)
(52) U.S. Cl. .................................................... 717/115
(58) Field of Classification Search .................. 717/115
See application file for complete search history.

(56) References Cited

U.S. PATENT DOCUMENTS 6,006,035 A  *  12/1999  Nabahi ........................ 717/175

* cited by examiner

*Primary Examiner*—John Chavis
(74) *Attorney, Agent, or Firm*—Mark S. Walker; Suiter Swantz pc llo

(57) ABSTRACT

A meta-data driven adaptive scripting tool which employs a framework across clients and servers to achieve dynamic binding for user defined commands at runtime and support different scripting languages residing in a heterogeneous distributed network. In a preferred embodiment the Bean Scripting Framework (BSF) defines the unified extension mechanism used, the meta-data associated with commands is in XML format, and the adaptive scripting tool is written in Java.

1 Claim, 3 Drawing Sheets

METHOD AND APPARATUS TO IMPLEMENT ADAPTIVE SCRIPTING TOOL

CROSS-REFERENCE TO RELATED APPLICATIONS

This application is filed concurrently with commonly assigned, non-provisional U.S. patent application Ser. No. (to be assigned), entitled "METHOD AND APPRATUS FOR A SYSTEM MANAGEMENT TOOL TO ADAPT COMMAND INTERFACE AND BEHAVIOR BASED ON INSTALLED FEATURES", listing as inventors Qinhua Wang, Lavena Chan, John Y. Chang, and Ajay A. Apte, having application Ser. No. 12/056,167.

BACKGROUND OF THE INVENTION

1. Field of Invention

The present invention relates generally to the field of computer software in a client server heterogeneous distributed network.

2. Description of Related Art

Various scripting languages exist, such as Jython (Java-base Python, a popular, object-oriented scripting language used for writing system utilities and Internet scripts), PERL, and Jacl (Java-base TCL/TK, standing for Tool Command Language/ToolKit, an interpreted script language used to develop a variety of applications, including GUIs, prototypes and CGI scripts). Scripting languages are interpreter based programming languages. Typically a scripting language provides a fixed set of built-in commands and allows users to expand the capability of commands by registering more user-defined commands through a proprietary extension mechanism. However, in a heterogeneous distributed network, where various such scripting languages exist, and various versions of the same language coexist side by side, it entails considerable effort to update all scripting languages with new user-defined commands.

Bean Scripting Framework (BSF) defines a unified extension mechanism for software developers to plug in commands so that a command can be made available in multiple scripting languages with a single implementation. More specifically, BSF defines a set of Java classes which enables Java application to support various scripting languages. This enables the access to Java objects and methods from all the scripting languages supported by BSF. For example, BSF allows one to write Java scripts in languages other than Java while providing access to the Java class library. Java script is an interpreted programming or script language from Netscape. It is somewhat similar in capability to Microsoft's Visual Basic, Sun's Tcl, the UNIX-derived Perl, and IBM's REXX. In general, script languages are easier and faster to code in than the more structured and compiled languages such as C and C++ and are ideal for programs of limited capability or that can reuse and tie together existing compiled programs. In addition, BSF permits any Java application to dynamically extend any scripting language that is supported by BSF, by providing an API (Application Programming Interface) that permits interacting with scripting language engines from the Java implementation and a scripting object registry mechanism that exposes Java objects to these scripting language engines.

While BSF reduces development effort for command-line functionality and user-defined commands, the extension mechanism of the BSF still requires software developers to implement scripting objects for additional commands and programically register these scripting objects to the BSF engine.

One limitation of BSF is that it requires additional development effort for each additional command. This is not desirable as the scripting tool needs to be modified whenever a new command is added or an existing command interface is enhanced or modified. This limitation leads to more significant drawbacks: it implies that each software product version needs to provide its own version of scripting tool as more commands are supplied over time, as the software product evolves. In a client-server computer environment, the scripting tool is typically just a client that communicates with the server process. This means users have to use different versions of the scripting tool for different versions of the product. This limitation presents a serious drawback in a heterogeneous distributed system, as a heterogeneous distributed system can contain software products of different versions. This limitation also makes it hard to use the same scripting tool to support multiple optional installable features, or multiple software products on the same system, as the existing scripting language extension mechanism requires the knowledge of available commands at development time.

Factoring all of the above, it can be seen that what is needed is a superior method and apparatus to manage heterogeneous distributed systems by defining a unified extension mechanism for disparate scripting languages having disparate user-defined command extension mechanisms. All the user-defined scripting commands are made available to all users of a distributed system, without having programmers develop and register new command line functionality with each separate scripting language every time a new user-defined scripting command is distributed in a network.

SUMMARY OF THE INVENTION

Accordingly, an aspect of the present invention is to provide an improved, dynamic and scalable method and apparatus for a adaptive scripting tool having an interface, with any necessary encapsulation and polymorphism, to allow for disparate scripting languages having disparate user-defined command extension mechanisms to be made available to all users of a heterogeneous distributed system, without requiring knowledge of available scripting commands at development time, nor prior to runtime, provided that the teachings of the present invention are employed.

The present invention employs software with a new dynamic Interface Definition Language (IDL) interface without stubs on either server or client computers, for cooperating with different scripting languages, for registering and instantiating new and existing scripting language commands associated with those scripting languages, with the IDL employing encapsulation, polymorphism, and dynamic (late) binding at runtime, through a new application programming interface (API) framework. In a preferred embodiment, the present invention employs Java proxy technology, a CFParser and a BSF engine, to increase portability and scalability when distributing new user-defined scripting language commands in a heterogeneous distributed network.

In a preferred embodiment, the method and apparatus of the present invention employs a software tool running on a computer.

The method and apparatus of the present invention is a computing platform running a software tool, which can accept human input, and may be written in any computer language (such as C, C++, Perl, Java or the like) run by a computer system having an operating system. The computer system typically has one or more processors, primary and secondary memory cooperating with the processor(s), which executes instructions stored in the memory, I/O means such as monitor, mouse and keyboard, and any necessary specialized hardware or firmware. Depending on the language used to construct and implement the software tool, the source code, object code and/or executables of the tool may have any number of classes, functions, objects, variables, templates, lines of code, portions of code and constructs (collectively and generally, "a process step", "step", "block", "functional module" or "software module") to carry out the invention in successive stages as described and taught herein, and may be either a standalone software application, or employed inside of or called by another software application, or as firmware. The software process or software module may be constructed so that one portion of code in the application performs a plurality of functions, as for instance in Object Oriented programming (e.g., an overloaded process). The converse is also true, in that a plurality of portions of code could perform a plurality of functions, and still be functionally the same as a single portion of code. At any stage of the process step of the present invention, intermediate values, variables and data may be stored for later use by the program. In addition, the binary executable or source code data comprising the software of the present invention may reside on computer readable storage medium (e.g., a magnetic disk, which may be portable, such as a hard drive, floppy drive; memory (e.g., flash RAM); or a CD-ROM disk).

The sum total of all of the above advantageous, as well as the numerous other advantages disclosed and inherent from the invention described herein creates an improvement over prior techniques.

The above described and many other features and attendant advantages of the present invention will become apparent from a consideration of the following detailed description when considered in conjunction with the accompanying drawings.

BRIEF DESCRIPTION OF THE DRAWINGS

Detailed description of preferred embodiments of the invention will be made with reference to the accompanying drawings. Disclosed herein is a detailed description of the best presently known mode of carrying out the invention. This description is not to be taken in a limiting sense, but is made merely for the purpose of illustrating the general principles of the invention. The section titles and overall organization of the present detailed description are for the purpose of convenience only and are not intended to limit the present invention.

It should be understood that one skilled in the art may, using the teachings of the present invention, vary the program flow of the flowcharts without departing from the spirit of the invention herein.

DETAILED DESCRIPTION OF THE INVENTION

The present invention is to more readily register, instantiate, and configure commands for scripting languages (e.g., Jacl, Jython, PERL, Java Script) in heterogeneous distributed systems having clients and servers. In a preferred embodiment the present invention is built using Java, an object-oriented programming language, and the distributed system is a client server model, but in general any programming language may be employed and the network may be a peer-to-peer network or other topology.

Figure 1:
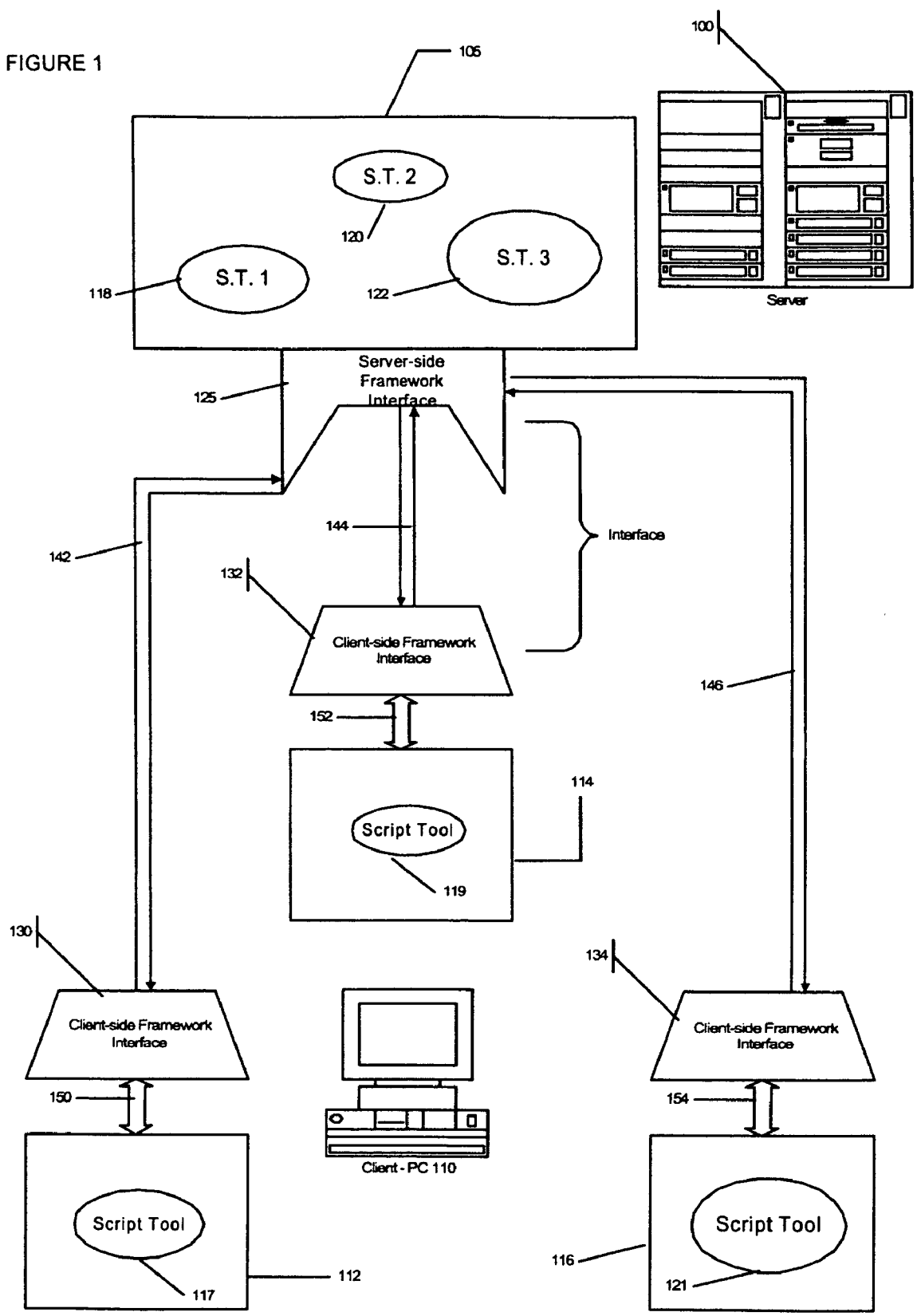
FIG. 1 is a schematic showing a heterogeneous distributed network in a client-server relationship, with the adaptive scripting tool and tool framework in both the client and server, communicating via an interface protocol.

Turning now to FIG. 1, there is shown heterogeneous distributed network in a client-server relationship, with the adaptive scripting tool framework residing in both the client and server, and communicating via an interface protocol. The framework comprises a set of software routines that provide a foundation structure for the adaptive scripting tool application. Frameworks take the tedium out of writing an application from scratch. Object-oriented application frameworks are generally comprised of a class library.

A server, such as application-server 100, houses the server software portion and framework of the software tool of the present invention, designated at 105, which may be stored in the memory of the server. The server 100 communicates with several clients in a distributed network, typically a plurality of personal computers, such as exemplified by personal computer 110, and clients 112, 114, 116, which may be any computer system, personal computer, wireless device, other server, and the like, forming with the server 100 a heterogeneous distributed system network. The client portion framework has access to various scripting language component programs (script tools, "S.T." or "Script Tool" in FIG. 1), designated as 117, 119 and 121, (e.g., Jacl, Jython, PERL, TCL/Tk), corresponding to server side framework 118, 120 and 122, which in general may be stored in the same memory or different memory as the client or somewhere else in the network.

An important aspect of the present invention is that it provides a framework to provide a unified architecture that encapsulates the disparate scripting languages via an interface, designated conceptually with server-side framework interface 125 and client-side framework interfaces 130, 132 and 134. These framework interfaces, which may also be termed at the architecture level a "protocol", or "IDL" (Interface Definition Language) at the program source code level or software component level an "API" (Application Programming Interface) or "ABI" (Application Binary Interface), typically contain at the software level one or more stubs (software routines that provide a common function), which allow user-defined commands to be associated with the framework interface and encapsulated thereby, so the user-defined commands may be seamlessly integrated into a distributed network, as described further herein. Each client would have its own interface, depending on its operating system and other requirements, e.g., client 112 has its own client interface 130, communicating with the server 100 via a communication channel 142; client 114, has client interface 132, communicating with server 100 via a channel 144; and client 116 has client interface 134, communicating with server 100 via a channel 146. Each client interface is designed to work with the server interface, by nature of being part of the same common framework. Thus each client interface is written to communicate with the client at the binary level, as designated by the double-arrows, e.g. arrow 150 for client 112, arrow 152 for client 114, and arrow 154 for client 116.

Each framework interface may have access to one or more stubs at the binary level, with the client and server interfaces being part of an overall common framework written with suitable application programming interfaces (API) at the source code level to allow encapsulation. In a preferred embodiment an object oriented language, Java, is employed to construct the software tool of the present invention, but in general any language may be used.

Figure 2:
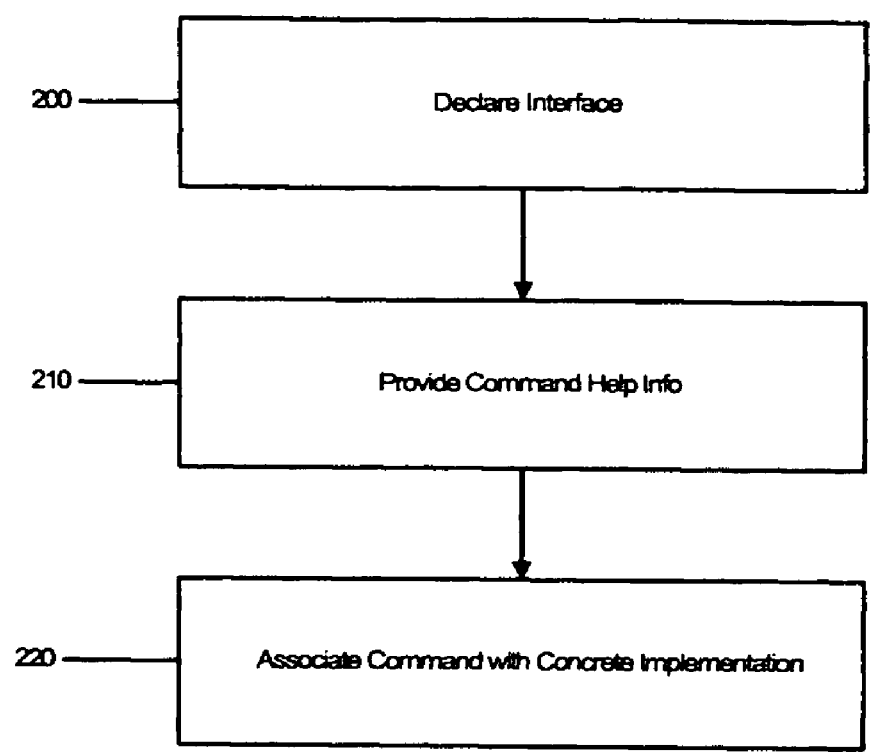
FIG. 2 is a flowchart showing the steps necessary to build the framework architecture for the adaptive scripting tool and to register a scripting language command.

Turning attention now to FIG. 2, there is shown a flowchart showing the steps necessary to build the framework architecture for the adaptive scripting tool and to register a new user-defined scripting language command. The goal is to provide a framework to implement scripting tools to dynamically adapt to a distributed network without the programmer having any prior knowledge of available commands at the development and programming of the scripting tool. A user-defined command comprises three portions: (1) a command interface in a scripting language neutral way, (2) detailed description about the command with national language support (National Language Support, NLS) and (3) command implementation.) The basic idea is to package these three portions with the optional installable feature that provides the command, so a scripting tool that conforms to this framework may dynamically discover (e.g., at run-time, via late binding) all the available commands in a distributed heterogeneous system at runtime, and make them available to any scripting user.

To construct such a framework, as shown in FIG. 2, a first step 200 is to declare the command interface, e.g., APIs in source code, or IDL (Interface Definition Language) of the framework architecture. This interface should be programming language neutral, and would be used to construct the server and client interfaces such as shown in FIG. 1 at 125 and 130, 132 and 134. In a preferred embodiment, XML format is employed due to its programming language neutral nature and excellent support for late binding for the interface at runtime. In Java, as a very dynamic object oriented language, it is possible to readily employ in memory class definition and dynamic proxy invocation to achieve dynamic binding (late binding), so that if scripting tools share a common interface, such as shown in FIG. 1 at 125 and 130, 132 and 134, the proper scripting tool will be called by the interpreter automatically, even though different objects (e.g., objects associated with the Script Tools on both client and server side, reference numbers 117-122) have different method algorithms (e.g., user defined commands, each associated with disparate scripting languages) associated with the same method function name.

Not to limit the scope of this invention, but one way to implement this late binding mechanism is to employ the CFParser (a Java technology that allows java application to define a class interface in memory at runtime) and Java dynamic proxy technology provided by Java Virtual machine (JVM) which associates the class interface defined through CFParser with the concrete command implementation on the server side. In Java, a dynamic proxy class is a class that implements a list of interfaces specified at runtime such that a method invocation through one of the interfaces on an instance of the class will be encoded and dispatched to another object through a uniform interface. Thus, a dynamic proxy class can be used to create a type-safe proxy object for a list of interfaces without requiring pre-generation of the proxy class, such as with compile-time tools. Dynamic proxy classes are useful to an application or library that needs to provide type-safe reflective dispatch of invocations on objects that present interface APIs.

For an example of the advantages of employing a common interface to allow dynamic binding, suppose there is a scripting language that has three versions, i.e. three releases, which for all intents and purposes can be considered three disparate or different scripting languages. Suppose that each of these different scripting tool versions have a slightly different way of executing a particular command, e.g., a slightly different method or function. With a common interface, and suitably employing abstract classes, base classes, and inheritance, as necessary (e.g., using the keyword 'interface' in Java or 'virtual', 'abstract' in C++), a single interface can be written, if a common framework is used, that encapsulates every version of the different scripting tool methods, with each script tool method (e.g., for an existing or new scripting language command) associated with the interface. As can be appreciated by one of ordinary skill using the teachings of the present invention, at runtime, the interpreter will automatically invoke the proper method associated with each scripting tool, even though the same method name (e.g., the same common interface) is used. In this way, a command user calling a method is oblivious to the fact that there may be several different versions of the same method. The encapsulation afforded by polymorphism (late-binding), if a common interface is employed as taught by the present invention, insures that the proper method for a particular command is called, without the user having to specify a particular version nor, from the development side, with the programmer having to write separate functions for each particular version of scripting tool and then having to identify which scripting tool version a user is trying to invoke.

A second step, step 210 in FIG. 2, is to provide a National Language Support (NLS) enabled command help information file to associate with a user-defined command. This command help file would give context sensitive help information for users unfamiliar with a new user-defined command. One important aspect this step is that framework provides the help text in consistent with the end user's locale, even if the server and client sides are in different locale. For instance, the client side is in German while the server side is in English, the framework displays help information in German by passing client side locale to server side and retrieve the help information in client's locale intelligently. In this way, the scripting tool adapts to the end user's environment seamlessly.

A third step, shown in FIG. 2 as 220, would be to associate the user-defined command interface defined in the first step with a concrete implementation of the backend functionality of this command. Typically the implementation of a scripting command includes but is not limited to the constructor of the command object that instantiates the command in memory and the logic that defines the behavior of the system when the command is invoked. For example, since scripting languages are interpreter based, this would mean having a user-defined command translated into a binary code, machine code, source code function call, class constructor, method or object code that can be called whenever the command is involved anywhere in the network.

In a preferred embodiment, the framework is implemented using XML (Extensible Markup Language) and XML protocol in an XML processor and parser, such as shown in FIG. 1 as scripting languages frameworks 118, 120 and 122 on the server side, and 117, 119 and 121 on the client side, at the time the user defined commands are distributed and installed on the network as part of an installable unit or a software product. Meta-data in XML format and XML schema are used to store meta-data information associated with the commands.

The command framework of FIG. 2 allows command users to query available commands (whether or not new user defined commands or standard commands, but in particular user-defined commands) in the heterogeneous distributed system. In addition, the framework instantiates commands and executes them. Further, the command framework discovers all the defined commands in the system, dynamically during runtime (e.g., late binding in object oriented languages), and routes the command requests to the server or client where the information associated with the command resides, i.e., routes the command to the command providers. In the client-server computing environment, this command framework includes two parts: a client side and a server side, as shown in FIG. 1. The client and server can communicate by passing messages to one another. The client side framework dynamically adapts to the server side framework and delegates the command requests to the server side framework.

Figure 3:
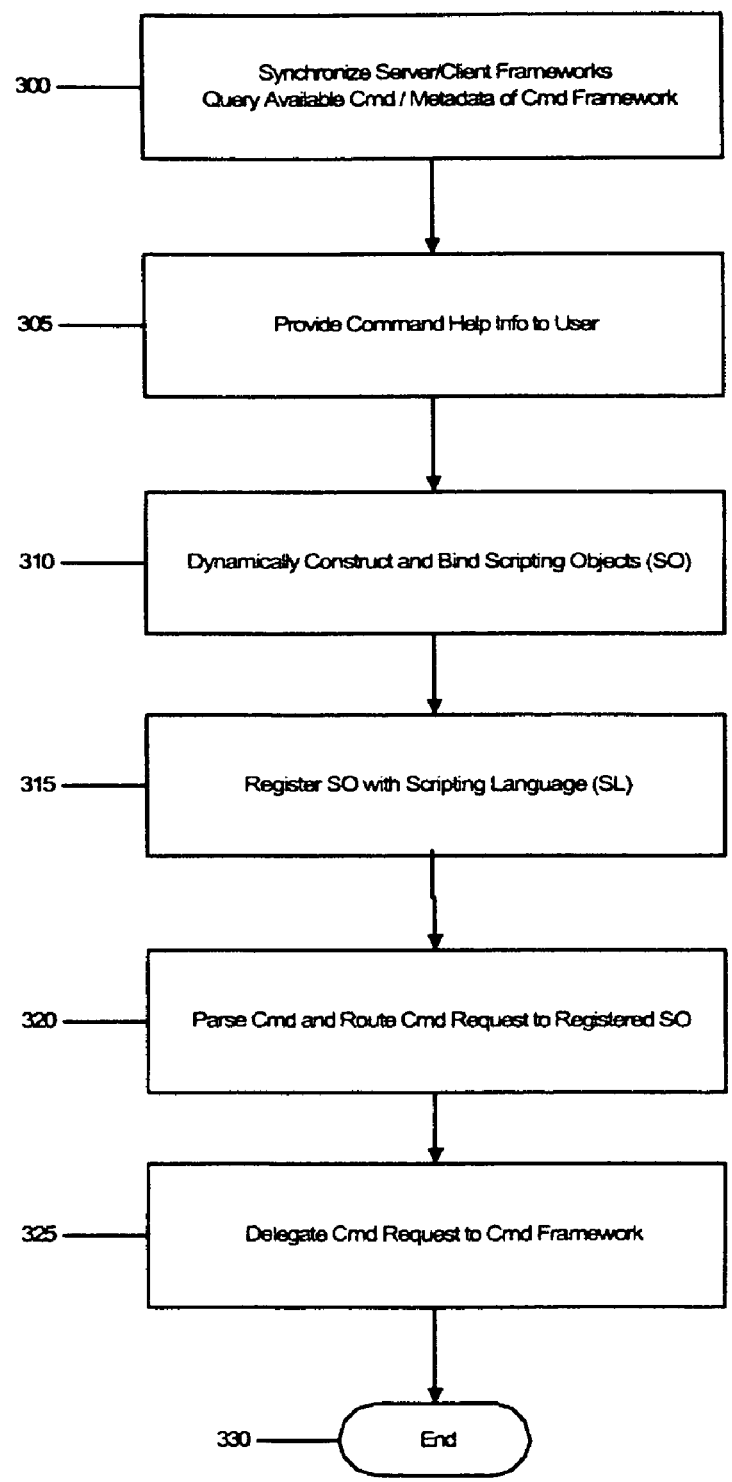
FIG. 3 is a flowchart of the program flow for the scripting tool that works within the framework described in FIGS. 1 and 2.

Turning attention now to FIG. 3, there is shown a flowchart of the program flow for the scripting tool that works within the framework described in FIGS. 1 and 2. The first step, shown as block 300, is to synchronize the server and client frameworks that are constructed as suggested in FIG. 2, by querying the network for the available commands, and searching the meta-data associated with the commands. Since each scripting tool discovers which commands are available de novo, at runtime, there is no need for programming each individual scripting tool, such as ST 1, ST 2 and ST 3 shown in FIG. 1 as 118, 120 and 122 in server software framework portion 105 and as client framework portions 117, 119 and 121, designated as "Script Tool" in clients 150, 152 and 154.

The second step in FIG. 3, block 305, is to provide any command help information to the user. This help information may be associated with the meta-data in XML format for a particular command, and may reside anywhere in the network.

The third step in FIG. 3, block 310, is to dynamically construct and bind a scripting object (SO) to a computer memory for each command, so that each SO is associated with a command. For an object oriented language such as Java, the constructor is constructed in source code by the 'new' operator, and bound by the interpreter at runtime. In Java, as in any object oriented language, it is possible to readily employ polymorphism and abstract classes to achieve dynamic binding (late binding), so that if scripting tools S.T. 1, S.T. 2 and S.T. 3 share a common interface, the proper scripting tool will be called by the interpreter automatically, even though different objects (e.g., objects associated with S.T. 1, S.T. 2 and S.T. 3) have different methods (e.g., user defined commands) associated with the same method name.

In the fourth step in FIG. 3, shown by box 315, each scripting object (SO) is registered with the particular scripting language through its extension mechanism.

In the fifth and sixth steps in FIG. 3, shown by boxes 320 and 325, the interpreter of the scripting language under consideration (from the previous steps) will parse the syntax of the scripting command in question, using the particular scripting language specific way, and route the request to a registered SO (from the previous step). The SO will delegate the command request to the command framework (step 325).

In a preferred embodiment the Bean Scripting Framework (BSF) engine is used to translate or make a single command implementation available in multiple scripting languages, and the CFParser is used to dynamically construct a Java class definition in memory, based on the command meta-data information in XML format provided with the command. Java proxy technology is used in a preferred embodiment to dynamically instantiate the scripting object using the created class definition and associate the scripting object with the command framework and command objects in Java.

In the final step, step 330 in FIG. 3, or upon any abnormal exception, the execution of the scripting tool of the present invention ends.

Although the present invention has been described in terms of the preferred embodiments above, numerous modifications and/or additions to the above-described preferred embodiments would be readily apparent to one skilled in the art. Thus while the present invention is implemented using XML, Java, CFParser and BSF technology, the present invention can be extended to other scripting languages, programming languages, and scripting extension mechanisms.

It is intended that the scope of the present invention extends to all such modifications and/or additions and that the scope of the present invention is limited solely by the claims set forth below.

We claim:

1. A method of implementing in a computer, having memory, an adaptive scripting tool application, said method comprising the steps of:

defining a common interface for an application framework;

providing a plurality of different scripting languages to cooperate with said interface;

said scripting languages all sharing said common interface of said framework;

defining at least one scripting command associated with one of said scripting languages;

constructing at least one scripting object;

associating said constructed scripting object with said scripting command of said scripting language, said scripting command cooperating with said interface of said framework;

defining a plurality of different scripting commands, each of said commands associated with at least one of said plurality of different scripting languages;

constructing at least one scripting object to associate with each of said different scripting commands; and binding said scripting object for each of said scripting commands to computer memory dynamically, at runtime.

* * * * *